US007102868B2

(12) United States Patent
Montena

(10) Patent No.: US 7,102,868 B2
(45) **Date of Patent: *Sep. 5, 2006**

(54) HIGH VOLTAGE SURGE PROTECTION ELEMENT FOR USE WITH CATV COAXIAL CABLE CONNECTORS

(75) Inventor: Noah Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 10/699,963

(22) Filed: Nov. 3, 2003

(65) Prior Publication Data

US 2004/0095703 A1 May 20, 2004

Related U.S. Application Data

(63) Continuation of application No. 09/726,821, filed on Nov. 30, 2000, now Pat. No. 6,683,773.

(51) Int. Cl.
*H02H 1/00* (2006.01)

(52) U.S. Cl. ...................................................... 361/119

(58) Field of Classification Search ................. 361/119
See application file for complete search history.

(56) References Cited

U.S. PATENT DOCUMENTS 3,883,774 A * 5/1975 Volkenau et al. ............. 315/58
4,456,800 A 6/1984 Holland
5,724,220 A * 3/1998 Chaudhry .................. 361/119
6,683,773 B1 * 1/2004 Montena ..................... 361/119

* cited by examiner

*Primary Examiner*—Phuong T. Vu
*Assistant Examiner*—Lucy Thomas
(74) *Attorney, Agent, or Firm*—Wall Marjama & Bilinski LLP

(57) ABSTRACT

An electrically conductive element for protecting electrical components positioned within a cable connector or cable terminator from high voltage surges includes a ring that is positioned in circumferentially surrounding relation to the input pin of the connector or terminator that carries the signal being transmitted by the coaxial cable. The ring includes at least one prong that extends radially inward therefrom which terminates in close but non-contacting relation to the input pin. When a high voltage surge of electricity is carried by the coaxial cable transmission line, a spark is formed in the gap between the prong and the cable connector or terminator. As a consequence, the high voltage surge is transferred to the surge protection element which in turn conducts the electricity to the grounded body of the connector or terminator.

11 Claims, 3 Drawing Sheets

HIGH VOLTAGE SURGE PROTECTION ELEMENT FOR USE WITH CATV COAXIAL CABLE CONNECTORS

CROSS-REFERENCE TO RELATED APPLICATIONS

This application is a continuation of and claims priority from U.S. patent application Ser. No. 09/726,821 filed Nov. 30, 2000 now U.S. Pat. No. 6,683,773 and entitled HIGH VOLTAGE SURGE PROTECTION ELEMENT FOR USE WITH CATV COAXIAL CABLE CONNECTORS.

BACKGROUND OF THE INVENTION

The present invention relates generally to devices for interconnecting coaxial cable to CATV systems, and more particularly to surge protection devices that protect the integrity of electronic components positioned within interconnect devices from high voltage surges of electricity.

In the CATV industry, cable television signals are traditionally transmitted by coaxial cable. As the cable is extended through a distribution network, several types of electrical devices, such as filters, traps, amplifiers, and the like, are used to enhance the signal and ensure signal integrity throughout the transmission. It is therefore necessary to prepare a coaxial cable for interconnection to these devices in such a manner so as to ensure that the signal is not lost or disrupted.

In a traditional interconnection of the coaxial cable to the electrical device, the coaxial cable is attached in axially aligned relation to a conductive pin extending outwardly from the electrical device. The pin then transmits the signal from the coaxial cable to the electrical device. A conductive lead extending rearwardly from the electrical device carries the electrically treated signal to the distribution cable in the CATV system.

It is also necessary to terminate a coaxial cable distribution line at its end point. To terminate the coaxial cable, its central conductor is interconnected to a termination connector, such as a UMTR. The termination connector includes an input end, a body portion which defines a cavity, electrical components mounted within the cavity (for instance, a capacitor to dissipate the charge, and resistor for impedance matching purposes), and an end cap that terminates the connector. The central conductor of the coaxial cable is electrically attached to a pin extending outwardly from the electrical components. As used herein, “connector” will refer to either a termination type connector or any other standard coaxial cable connectors used in a CATV system.

On occasion, a high voltage surge may be transmitted through the coaxial cable, for instance, due to a lightning strike. If this high voltage surge is permitted to be picked up by the input pin and transmitted to the electrical device within the connector, the device would become inoperable due to the electrical components essentially melting or otherwise deteriorating as a consequence of the surge. A new connector would then need to be installed at the site of the surge.

It is therefore a principal object and advantage of the present invention to provide a cable connector having a device that provides an alternate path for high voltage surges of electricity in order to protect the integrity of any electrical components positioned within the connector.

It is an additional object and advantage of the present invention to provide a surge protection device that may be easily installed on an otherwise conventional cable connector.

It is a further object and advantage of the present invention to provide a surge protection device for a cable connector that is inexpensive to manufacture.

Other objects and advantages of the present invention will in part be obvious, and in part appear hereinafter.

SUMMARY OF THE INVENTION

In accordance with the forgoing objects and advantages, the present invention provides a conventional cable connector, such as a UMTR (Universal Male Terminator type connector), that further comprises an element for protecting the electrical components positioned within the connector from high voltage surges. The surge protection element comprises a ring that is positioned in circumferentially surrounding relation to the input pin that carries the signal being transmitted by the coaxial cable. The ring includes at least one, and preferably three prongs that extend radially inwardly therefrom and terminate in close, but non-contacting relation to the pin.

The ring portion of the surge protection element is positioned in contacting relation to a shoulder formed on the body of the cable connector, and is composed of an electrically conductive material, such as, but not limited to, brass. The coaxial cable, which is electrically interconnected to the head of the pin (it should be understood that there may be other common elements disposed between the coaxial cable and head of the pin, such as a tap), passes through the ring portion, adjacent the prong(s), but in non-contacting relation thereto, thereby forming a gap between the prong(s) and cable. If a high voltage surge of electricity is carried by the coaxial cable, such as might occur if it is struck by lightening, a spark will be formed in the gap between the prongs and the cable due to the conductive composition of the surge protection element. As a consequence, the high voltage surge will be transferred to the surge protection element which, in turn, will conduct the electricity to the body of the connector to which it is positioned in contacting relation. The body of the conductor will then carry the high voltage surge of electricity around the electrical components positioned within it, and ultimately to ground. Thus, the high voltage surge will not pass into the electrical components positioned within the connector.

The level of the surge which will trigger the spark to arc between the surge protection element and the coaxial cable may be selectively controlled by using such devices with varying length prongs extending radially inwardly. The closer a prong is positioned relative to the coaxial cable, the lower the voltage level that will cause the spark. The relationship between the size of the spark gap and the voltage level which will trigger a spark is well known in the art.

BRIEF DESCRIPTION OF THE DRAWINGS

The present invention will be better understood and more fully appreciated by reading the following Detailed Description in conjunction with the accompanying drawings, wherein.

DETAILED DESCRIPTION

Figure 1:
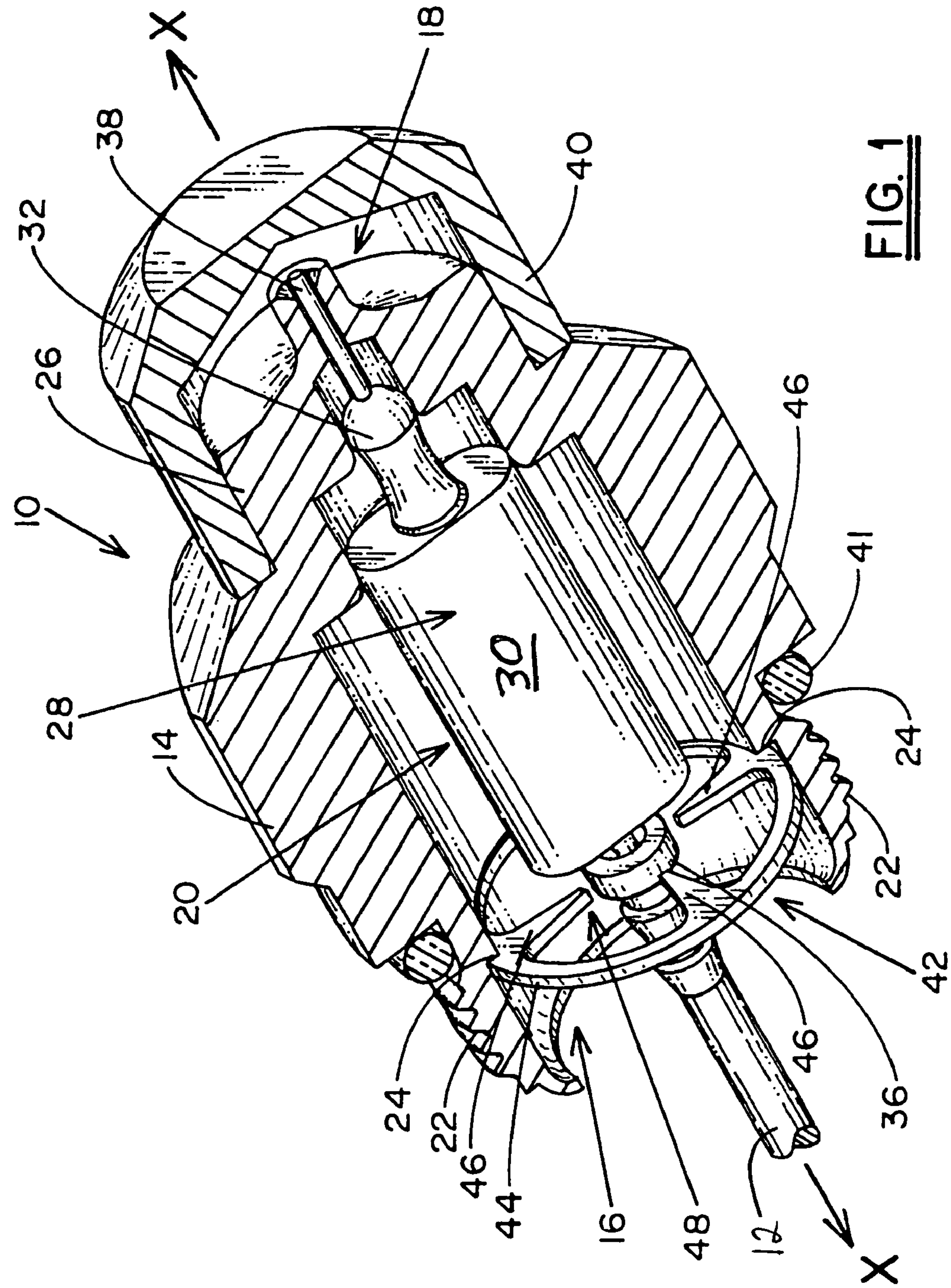
FIG. 1 is a partial, longitudinal cross-sectional view of a CATV system, including a coaxial cable connector.
Figure 2:
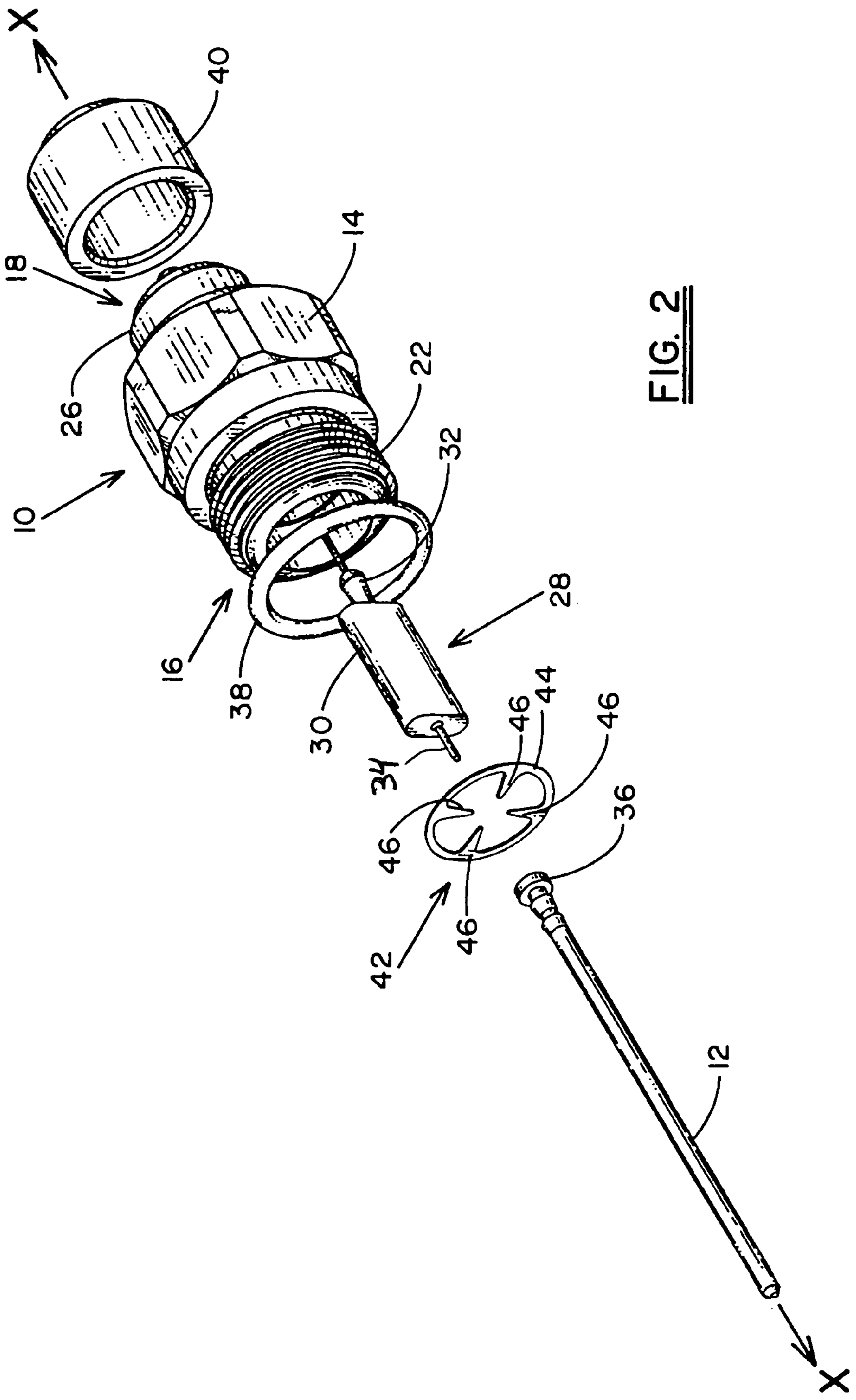
FIG. 2 is an exploded perspective view of the present invention.

Referring now to the drawings, wherein like reference numerals refer to like parts throughout, there is seen in FIG. 1 a coaxial cable connector, designated generally by reference numeral 10, extending along a longitudinal axis X—X and having a coaxial cable interconnected thereto. Although not expressly illustrated in the drawings, it should be understood that the coaxial cable comprises a central conductor immediately surrounded by a layer of dielectric material of predetermined thickness, an outer conductor concentric with the central conductor and surrounding the dielectric material, and an outer layer of insulating material surrounding the exterior surface of the outer conductor.

Connector 10 generally comprises a conductive body 14 having an input end 16, an output end 18, and a cavity 20 defined therein. Body 14 includes an externally threaded portion 22 positioned at its input end 16 (it should be understood that connector 10 is illustrated as being a "male" UMTR type termination connector, but the present invention would work equally well with female connectors and other standard type connectors used in a CATV system), a shoulder 24 formed interiorly of threaded portion 22 at the interface of input end 16 and cavity 20, and a rear end 26 formed at output end 18.

An electrical component, designated generally by reference numeral 28, and illustrated as being composed of a capacitor 30 and a resistor 32 extending rearward therefrom, is positioned within cavity 20. It should be understood that electrical component 28 could be any standard type of electrical component that is incorporated into coaxial cable conductors, such as integrated circuits that form filters, amplifiers, traps, and the like. A pin 34 is soldered or otherwise connected to electrical component 28 and extends forward therefrom along longitudinal axis X—X. Pin 34 terminates in a head 36 of a conductive pin 12 at which point it is electrically interconnected to the central conductor of the coaxial cable. Electrical component 28 further comprises a lead 38 that is soldered or otherwise securely connected to body 14 and extends rearwardly from resistor 32 along longitudinal axis X—X.

Connector 10 further comprises a standard end cap 40 positioned in covering relation to output end 18 to protect the connection of lead 38 to body 14, among other things, and an O-ring 41 positioned at the interface of body 14 and threaded portion 22 which prevents moisture, dust, and other contaminants from entering connector 10.

Under normal operating conditions, the coaxial cable carries and transmits 90 Volts AC. There may be occasions, however, where high voltage surges impact upon and are carried by the coaxial cable, such as, for example, in the event it is struck by lightening. If this high voltage surge was to be transmitted to pins 12 and 34 and then carried to electrical component 28, the devices comprising electrical component 28 would in most instances become inoperable as they would not be able to receive such surges without their conductive elements melting or otherwise deteriorating.

To prevent a damaging amount of such high voltage surges from being transmitted to electrical component 28, the present invention further comprises a surge protective element, designated generally by reference numeral 42, which is composed of a conductive material, such as bronze, and is of a predetermined width W. Surge protective element 42 generally comprises a ring-shaped outer body 44 and at least one prong 46 extending radially inwardly therefrom. Although surge protective element 42 is illustrated in the drawings as including four, equally spaced apart prongs 46, it has been found that three prongs 46 work just as well, and they need not be equally spaced apart, and one (or any number) prong would also work. The width W and material composition of surge protective element 42 dictate how much voltage it will withstand, but it has been found to withstand voltages of up to 6,000 Volts at 3,000 Amps for a period of 50 microseconds when composed of brass and of a width W of about 0.020 inches, as is required by IEEE Specification 62.41.

Surge protective element 42 is positioned with its body portion 44 in electrically conductive contact with shoulder 24, and prong(s) 46 extending radially inward therefrom. To ensure that body portion 44 remains in electrically conductive contact to shoulder 24, surge protective element may be press fit, or otherwise securely engaged with connector 10. When in this position, prong(s) 46 are positioned in close proximity to, but in non-contacting relation to head 36, thereby leaving a spark gap 48 therebetween (see FIG. 1). As is well known in the art, the dielectric strength of air is 3,000,000 Volts/Meter and thus a voltage of 300 Volts will produce a spark in an air gap of 0.1 mm. Thus, the size of spark gap 48 dictates the voltage level at which surge protective element 42 will trigger the electric current to pass through body 14 (and go to ground) instead of through electrical component 28.

Thus, in the event of a high voltage surge of electricity passing through connector 10, if the surge is above a predetermined value as determined by the size of spark gap 48, a spark will arc across gap 48, and the majority of current will run through prong(s) 46 and to ground through the conductive connection between body portion 44 and shoulder 24. A small amount of current may pass into connector 10, but due to the differences in resistive properties between surge protective element 42 and electrical component 28, only a non-harmful amount of current will pass into connector 10. Accordingly, surge protective element 42 protects electrical components 28 from high voltage surges of electricity by providing an alternate path for the current that goes around the components and to ground through body 14.

Figures 3, 3A, 3B, 3C, 3D:
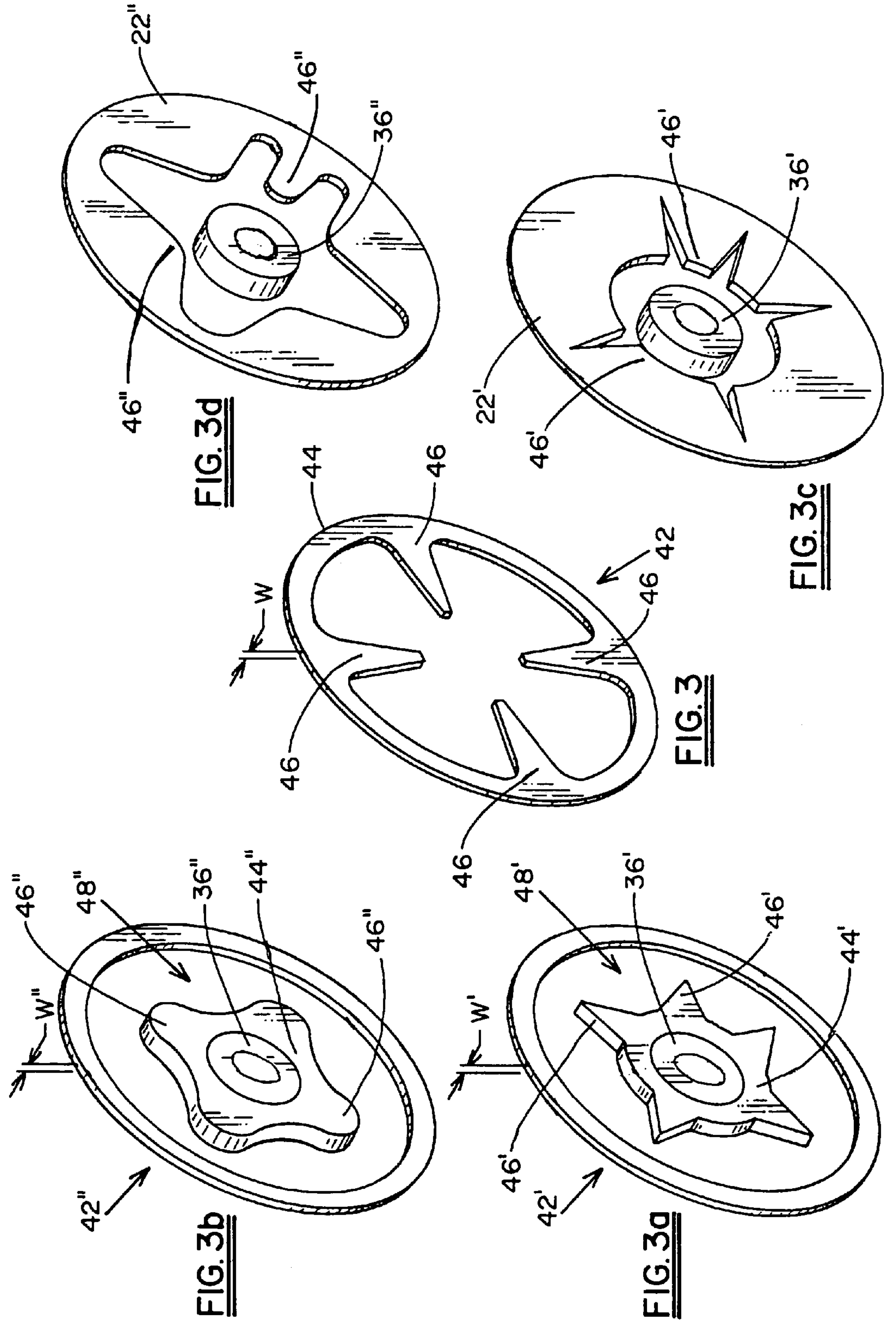
FIG. 3 is a perspective view of an embodiment of a surge protection element.
FIG. 3A is a perspective view of an alternate embodiment of a surge protection element.
FIG. 3B is a perspective view of a second alternate embodiment of a surge protection element.
FIG. 3C is a perspective view of a third alternate embodiment of a surge protection element.
FIG. 3D is a perspective view of a fourth alternate embodiment of a surge protection element.

Referring to FIGS. 3A and 3B, alternate embodiments of surge protection element 42' and 42" are illustrated, respectively. Surge protection element 42' comprises a ring-like body 44' (i.e., a washer) and prongs 46' are integrally formed on and extending radially outwardly from body 44'. The prongs 46' are defined by star shaped protrusions extending radially outwardly from head 36'. Again, surge protective element 42' would work if it included only a single, or any other number of protrusions 46'.

Alternatively, surge protective element 42' could be composed of only head 36' having prongs 46' extending radially outwardly therefrom, provided the length of each prong 46' was sufficient to leave an appropriate spark gap between their ends and the internal surfaces of threaded portion 22'.

Surge protective element 42" comprises a ring-like body 44" (i.e., a washer), and prongs 46" integrally formed on and extending radially outwardly from the head 36" of pin 34". Prongs 46" are defined by annularly extending, sinusoidal curve shaped protrusions extending radially outwardly from head 36". Again, surge protective element 42" would work if it included only a single, or any other number of protrusions 46".

Alternatively, surge protective element 42" could be composed of only pin 34" having prongs 46" extending radially outwardly therefrom, provided the length of each prong 46" was sufficient to leave an appropriate spark gap between their ends and the internal surfaces of threaded portion 22".

Referring to FIGS. 3C and 3D, the prongs 46 shown in FIG. 3 can be greatly enlarged as are prongs 46' in FIG. 3C, this giving ring-line body 44 the appearance of more of a disc than a ring, or can be curved as are prongs 46" in FIG. 3D. In each case, the spark gap is between head 36', 36" and prongs 46', 46" respectively. It should be understood that the shape and composition of surge protective element 42 could vary from those of the disclosed embodiments without departing from the spirit and scope of the present invention as defined in the appended claims.

What is claimed is:

1. A high voltage surge protection device adapted for use in a CATV system that includes a coaxial cable having a central conductor, an outer conductor concentrically positioned in surrounding relation thereto, and a dielectric layer disposed between the central and outer conductors, said surge protection device comprising:

a housing having an input end and a body portion that defines an internal cavity;

an electrical component positioned entirely within said cavity; and an electrically conductive, surge protective element positioned between said input end and said electrical component, and in electrically operative communication with said body portion;

wherein said surge protective element is a ring, and where said ring is configured to surround and to not make physical contact with a conductive pin included within said electrical component and where a portion of said ring is in physical and electrical contact with a shoulder formed within said body portion of said housing.

2. The high voltage surge protection device of claim 1, wherein said surge protective element includes at least one prong extending radially inward from said ring.

3. The high voltage surge protection device of claim 1, wherein said surge protective element is of a width that is about 0.020 inches.

4. The high voltage surge protection device of claim 1, wherein said conductive pin is extending forward from said electrical component and is electrically connected with the central conductor of the coaxial cable, and said ring is disposed such that said conductive pin is substantially centered within said ring.

5. A method for providing an alternate path to ground of a high voltage surge carried by a coaxial cable in a CATV distribution system, prior to the surge passing through a coaxial cable connector having an input end, a body portion defining an internal cavity, an electrical component positioned within the cavity, and an input pin extending forward from the electrical component toward the input end and electrically connected to a central conductor of the coaxial cable, said method comprising the steps of:

positioning an electrically conductive ring-shaped surge protective element entirely within said cavity and physically and electrically connected to said body portion of said connector; and where said ring-shaped surge protective element is configured to surround and to not make physical contact with an input pin; and maintaining an air gap of predetermined size between said surge protective element and said input pin.

6. The method of claim 5, wherein said ring-shaped surge protective element includes at least one prong extending radially inward from said ring-shaped surge protective element toward said input pin.

7. The high voltage surge protection device of claim 2, wherein said at least one prong is shaped substantially as a triangle.

8. The high voltage surge protection device of claim 2, wherein said at least one prong is shaped substantially as a curved element.

9. The method of claim 6, wherein said electrical component includes an input pin extending forward therefrom which is electrically connected to a central conductor of a coaxial cable, and said ring-shaped surge protective element is disposed such that said input pin is substantially centered within said ring-shaped surge protective element.

10. A high voltage surge protection device adapted for use in a CATV system that includes a coaxial cable having a central conductor, an outer conductor concentrically positioned in surrounding relation thereto, and a dielectric layer disposed between the central and outer conductors, said surge protection device comprising:

a housing having an input end and a body portion that defines an internal cavity;

an electrical component positioned entirely within said cavity;

an input conductor that provides electrical contact between said input end and said electrical component;

an electrically conductive, surge protective element positioned between said input end and said electrical component, and in electrical contact with said body portion; and wherein said surge protective element includes a ring shaped portion that surrounds said input conductor, said ring shaped portion not in physical contact with said input conductor; and wherein said ring shaped portion is in physical and electrical contact with a shoulder formed within said body portion of said housing.

11. A method for providing an alternate path to ground of a high voltage surge carried by a coaxial cable in a CATV distribution system, prior to the surge passing through a coaxial cable connector having an input end, a body portion defining an internal cavity, an electrical component positioned within the cavity, and an input pin extending forward from the electrical component toward the input end and electrically connected to the central conductor of the coaxial cable, said method comprising the steps of:

positioning an input pin that provides electrical contact to an electrical component located within a cavity defined by a body portion of a connector;

positioning an electrically conductive ring-shaped surge protective element, made entirely of one conductive material, entirely within said cavity so that it surrounds said input pin and so that it physically and electrically connects to said body portion of said connector; and maintaining an air gap of predetermined size between said surge protective element and said input pin.

* * * * *